US010139082B2

United States Patent
Yen et al.

(10) Patent No.: US 10,139,082 B2
(45) Date of Patent: Nov. 27, 2018

(54) PLANAR OLED LAMP MODULE

(71) Applicants: Feng-Wen Yen, Taipei (TW);
Ching-Yan Chao, Hsinchu (TW)

(72) Inventors: Feng-Wen Yen, Taipei (TW);
Ching-Yan Chao, Hsinchu (TW)

( * ) Notice: Subject to any disclaimer, the term of this patent is extended or adjusted under 35 U.S.C. 154(b) by 0 days.

(21) Appl. No.: 15/649,666

(22) Filed: Jul. 14, 2017

(65) Prior Publication Data

US 2018/0112854 A1   Apr. 26, 2018

(51) Int. Cl.
| | |
|---|---|
| *F21V 23/00* | (2015.01) |
| *F21V 15/01* | (2006.01) |
| *F21V 3/02* | (2006.01) |
| *F21V 19/00* | (2006.01) |
| *F21V 19/04* | (2006.01) |
| *F21Y 115/15* | (2016.01) |
| *F21V 23/06* | (2006.01) |
| *F21V 31/00* | (2006.01) |
| *F21Y 105/00* | (2016.01) |
| *F21S 6/00* | (2006.01) |
| *F21W 121/00* | (2006.01) |
| *F21V 15/00* | (2015.01) |

(52) U.S. Cl.
CPC ............. *F21V 15/012* (2013.01); *F21V 3/02* (2013.01); *F21V 19/0015* (2013.01); *F21V 19/04* (2013.01); *F21S 6/003* (2013.01); *F21V 15/005* (2013.01); *F21V 23/06* (2013.01); *F21V 31/00* (2013.01); *F21V 31/005* (2013.01); *F21W 2121/00* (2013.01); *F21Y 2105/00* (2013.01); *F21Y 2115/15* (2016.08)

(58) Field of Classification Search
CPC .... F21S 6/003; F21V 15/012; F21V 19/0015; F21V 19/04; F21V 23/06; F21V 31/005; F21V 15/00; F21V 31/33; F21W 2121/00; F21Y 2105/00; F21Y 2115/15
See application file for complete search history.

(56) References Cited

U.S. PATENT DOCUMENTS

| | | | | |
|---|---|---|---|---|
| 8,508,136 | B2 * | 8/2013 | Hente | H05B 33/0896 315/133 |
| 2010/0245109 | A1 * | 9/2010 | Ashoff | F21S 2/005 340/4.3 |
| 2011/0157893 | A1 * | 6/2011 | Ngai | F21S 2/00 362/249.02 |
| 2017/0146203 | A1 * | 5/2017 | Belaidi | H01L 25/048 |

* cited by examiner

*Primary Examiner* — Peggy Neils

(57) ABSTRACT

The present invention discloses a planar OLED lamp module, containing a planar OLED lamp and a lamp module. The planar OLED lamp module adopts the separable design which has electrical connecting function through elastic metal units. The planar OLED lamp can be removed or dismantled during production assembly and maintenance more easily and quickly, therefore the cost can be significantly down.

11 Claims, 6 Drawing Sheets

PLANAR OLED LAMP MODULE

BACKGROUND OF THE INVENTION

1. Field of the Invention

The present invention generally relates to an OLED lighting application, in particular to a planar OLED lamp module.

2. Description of the Related Art

Organic light-emitting diode (OLED) is composed of an organic material layer sandwiched in between two electrodes, which can emit light under proper voltage. As OLED is of high efficiency, light and thin, of low power consumption, of wide view angle, of high contrast, easy to manufacture and of short response time, OLED can be applicable to flat panel display and the lighting industry.

Compared with OLED, inorganic LED is a point light source, the light emitted by inorganic LED is very concentrative and may result in blue light hazard. On the contrary, OLED is a planar light source, the light emitted by OLED is soft and will not result in glare; thus, OLED is very suitable to be applied to indoor illumination. Besides, OLED is of high flexibility and does not tend to overheat, so is easy to be integrated with building materials to create more light application situations.

Currently, OLED is still in its start-up stage in the lighting industry, commercialized OLED products are still hard to be seen in the market. Among current available OLED lighting products and prior art, the OLED lamp is fixed on the power driving module, as disclosed by Taiwan Patent No. 1539110; or the OLED lamp is welded on the circuit board, as disclosed by Taiwan Patent No. 1524570. Regarding the above OLED lamp module products, the OLED lamp is fixed inside the lamp module, so it is very inconvenient to install or dismantle the OLED lamp during production assembly and maintenance.

Accordingly, the planar OLED lamp module in accordance with the present invention adopts the separable design with an elastic electrical connection mechanism in order to simplify the assembly of the OLED lamp module; in this way, users can swiftly replace the OLED lamp by themselves so as to achieve the object of reducing the maintenance cost.

SUMMARY OF THE INVENTION

Therefore, it is a primary objective of the present invention to provide a planar OLED lamp module, which adopts the separable design with an elastic electrical connection mechanism in order to simplify the assembly of the OLED lamp module and lower the cost.

To achieve the foregoing objective, the present invention provides a planar OLED lamp module; the planar OLED lamp module includes at least one planar OLED lamp and a slot module. The planar OLED lamp includes an OLED substrate and an OLED cover plate; the OLED substrate has an OLED electrode surface, and the OLED electrode surface has at least one exposed positive electrode and at least one exposed negative electrode. One side of the frame of the slot module is provided with at least one slot opening, and the slot opening includes at least two elastic metal units disposed therein and capable of connecting to an external power source; the largest side of the slot module has at least one transparent zone. The planar OLED lamp can be inserted into the slot opening to electrically connect the exposed positive and negative electrodes of the planar OLED lamp to the elastic metal units therein respectively, whereby the light emitted by the planar OLED lamp can be transmitted out of the transparent zone.

In a preferred embodiment, the slot opening further includes at least one elastic element therein, and the elastic element provides a reverse force in the insertion direction of the planar OLED lamp inserted into the slot opening in order to conveniently take out the planar OLED lamp.

In a preferred embodiment, in response to the arrangement design of the metal electrodes of the planar OLED lamp, the slot module includes at least two elastic metal units disposed therein, and the voltage supplied by the external power source connecting to the elastic metal units does not exceed 12 volts; besides, the elastic metal units are disposed at the same side or at different sides.

In a preferred embodiment, for the purpose of simplifying the components of the planar OLE lamp module, the elastic unit and the elastic metal units disposed inside the slot module are integrally formed; in other words, they can be combined to form one element so as to reduce the assembly time and the component cost.

In a preferred embodiment, for the purpose of protecting the planar OLED lamp of the planar OLED lamp module to avoid that the planar OLED lamp is accidentally damaged due to external impact, the transparent side of the slot module is provided with a protection plate with light transmittance. In addition, the outer surface of the slot opening is provided with a sealing cap, which can be used to seal the slot opening in order to beautify the appearance and better the integrity of the planar OLED lamp module; in addition, the sealing cap can also prevent dust from entering the internal space of the planar OLED lamp module.

In a preferred embodiment, the slot module can also be provided with two or more of the slot openings, which can satisfy the requirements of larger planar OLED lamp modules and can be applied to various lighting products, such as desk lamp, table lamp, decoration lighting products and common lighting products, etc. Further, in response to different appearance designs, the largest side of the slot module is substantially square, rectangular, elliptic or circular in shape so as to match different environment landscape designs.

According to the disclosure of Taiwan Patent No. 1539110, the OLED lamp is fixed on the power driving module; according to the disclosure of Taiwan Patent No. 1524570, the OLED lamp is welded on the circuit board, as shown in FIG. 1. For these OLED lamp module, it is necessary to dismantle the OLED lamp from the module and then weld a new OLED lamp on the module when the OLED lamp ages or malfunctions, which will waste very much time and require a lot of hard work, or the whole OLED lamp module should be replaced, so the maintenance cost may further include the power driving module or circuit, which incurs unnecessary cost to consumers and wastes a lot of environmental resources.

Accordingly, the present invention adopts the separable design which has electrical connecting function through elastic metal units in order to achieve the object that consumers can swiftly replace the OLED lamp by themselves. In this way, the time and cost of replacing the lamp can be considerably reduced, so consumers will be more willing to use the OLED lighting lamp and the competitiveness of the OLED lighting products can be increased, which completely satisfies the environment-friendly requirements and conforms to the trend of green energy-saving.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
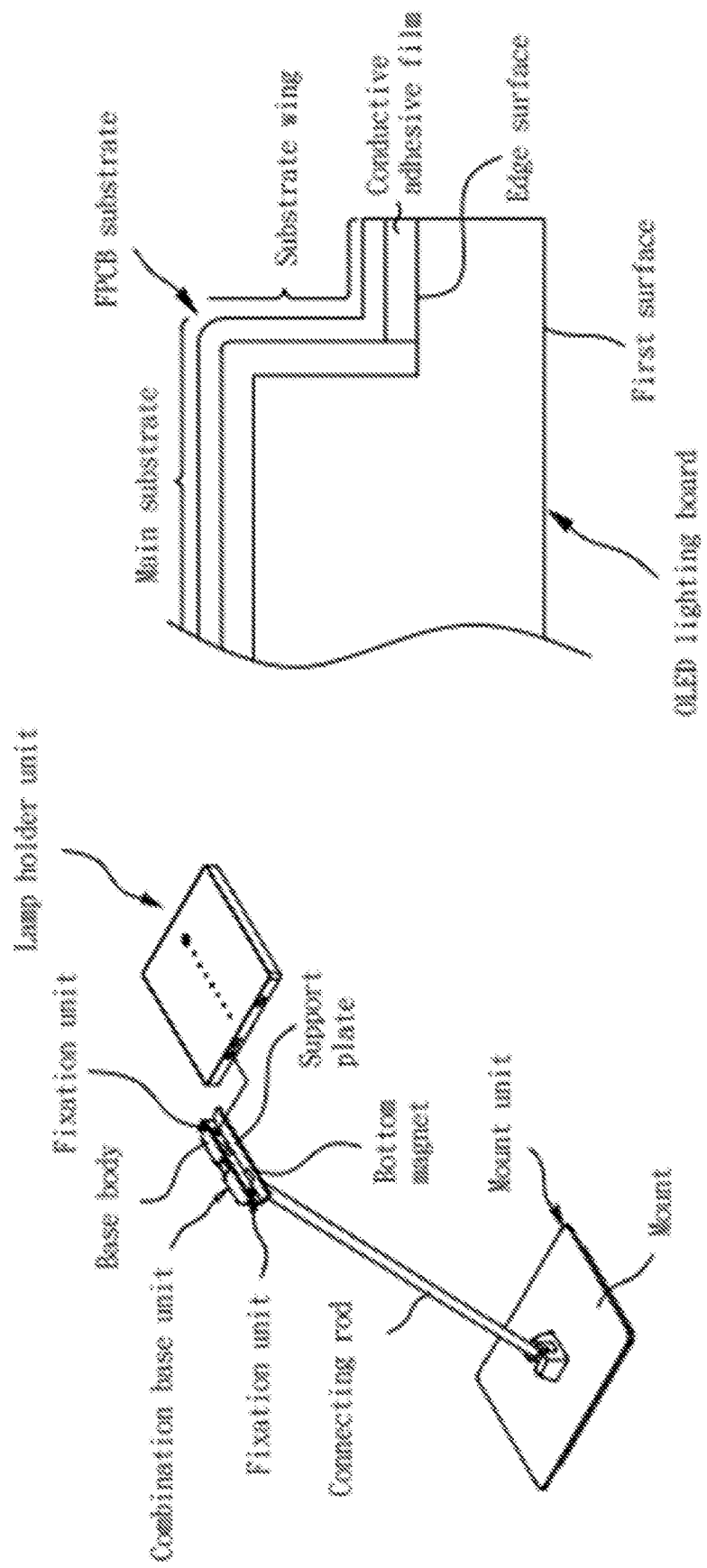
FIG. 1 is a schematic view of OLED lamp modules disclosed by the patent literature cited by the present invention.
Figure 2:
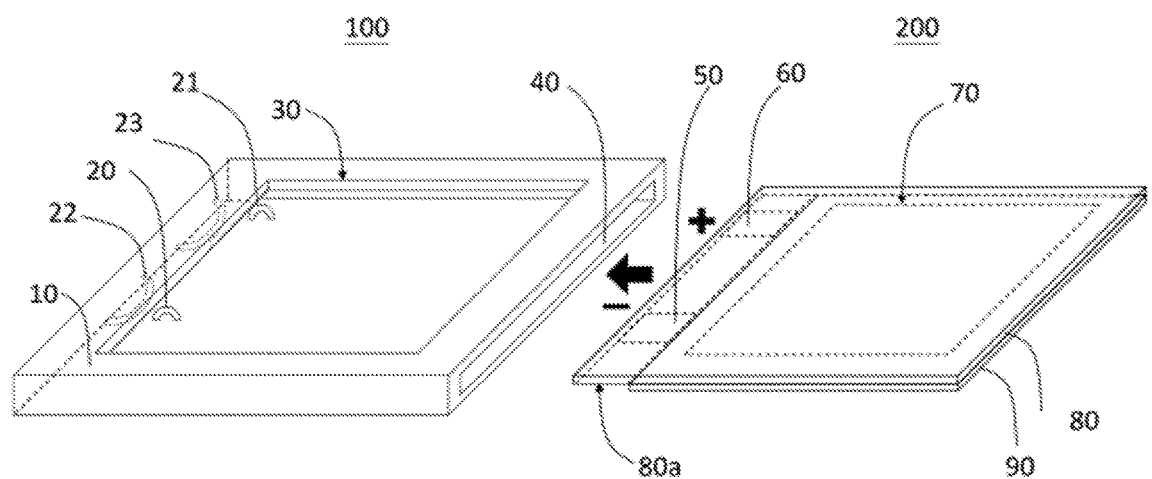
FIG. 2 is a schematic view of a first embodiment of an OLED lamp module in accordance with the present invention.

As shown in FIG. 2, a first embodiment of an OLED lamp module in accordance with the present invention, the planar OLED lamp module includes at least one planar OLED lamp 200 and a slot module 100. The planar OLED lamp 200 includes an OLED substrate 80 and an OLED cover plate 90. The OLED substrate 80 has a light-emitting zone 70 and an OLED electrode surface 80a, and the OLED electrode surface 80a lies between the OLED substrate 80 and the OLED cover plate 90. The OLED substrate surface 80a is provided with at least one exposed positive electrode 60 and at least one exposed negative electrode 50. One side of the frame of the slot module 100 is further provided with at least one slot opening 40, and the slot opening 100 includes at least two elastic metal units 20, 21 disposed therein and capable of connecting to an external power source. The largest side 10 of the slot module 100 has at least one transparent zone 30. The planar OLED lamp 200 can be inserted into the slot opening 40 to electrically connect the exposed positive electrode 60 and the exposed negative electrode 50 of the planar OLED lamp 200 to the elastic metal unit 21 and the elastic metal unit 20 inside the slot opening 40 respectively. Besides, the light-emitting zone 70 of the OLED substrate 80 is corresponding to the transparent zone 30, whereby the light emitted by the planar OLED lamp 200 can be transmitted out of the transparent zone 30.

In the embodiment, the slot module 100 includes at least two elastic metal units 20, 21 therein, and the voltage supplied by the external power source connecting to the elastic metal units 20, 21 does not exceed 12 volts.

In the embodiment, the slot opening 40 further includes at least one elastic element 22, and the elastic element 22 provides a reverse force in the insertion direction of the planar OLED lamp 200 inserted into the slot opening 40 in order to conveniently remove and install the planar OLED lamp 200.

Figure 3:
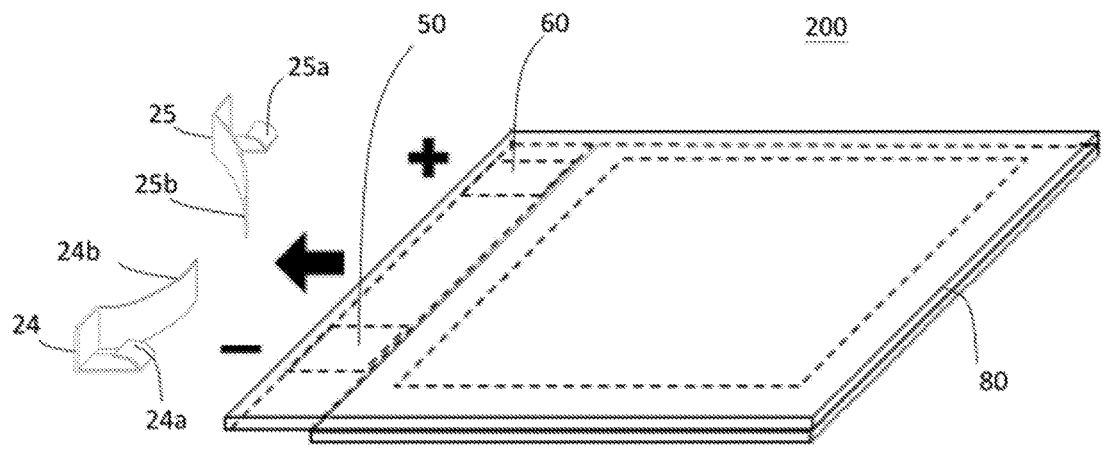
FIG. 3 is a schematic view of an elastic composite element and a planar OLED lamp in accordance with the present invention.

In the embodiment, the elastic unit 22 and the elastic metal unit 20 are integrally formed: in other words, they can be combined to form an elastic composite element 24, as shown in FIG. 3 (FIG. 3 omits the slot module 100 in order to more clearly show the elastic composite elements 24, 25). The elastic composite element 24 has two parts, an elastic metal unit 24a and an elastic element 24b, which allows the elastic composite element 24 to electrically connect to the negative electrode 50; meanwhile, the elastic element 24b can provide a reverse force in the direction of the in the insertion direction of the planar OLED lamp 200 inserted into the slot opening 40. The function of the elastic composite element 25 is similar to that of the elastic composite element 24 in order to facilitate the electrical connection of the planar OLED lamp 200 and users can conveniently remove and install the planar OLED lamp 200.

Figure 4:
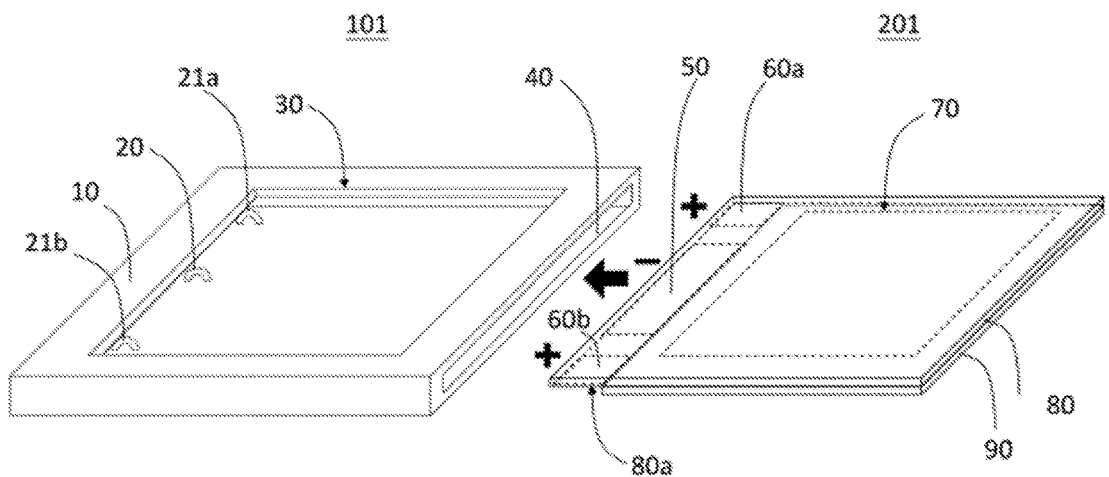
FIG. 4 is a schematic view of a second embodiment of an OLED lamp module in accordance with the present invention.
Figure 5:
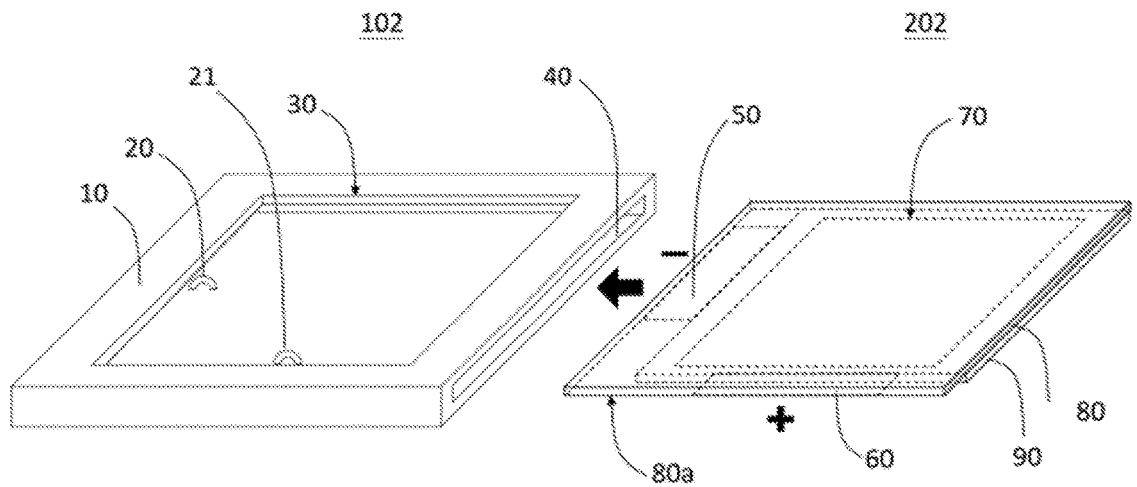
FIG. 5 is a schematic view of a third embodiment of an OLED lamp module in accordance with the present invention.

Besides, as shown in FIG. 4, as the positive electrodes of an OLED lamp usually have higher impedance, the IR drop thereof tends to increase; for the reason, the brightness of the lamp may not be uniform. However, if the positive electrodes 60a, 60b are respectively disposed at two sides of the negative electrode 50 of the planar OLED lamp 201 and the elastic metal units 21a, 21b are also respectively disposed at two sides of the elastic metal unit 20, the negative electrode 50 and the positive electrodes 60a, 60b can simultaneously supply the current for the planar OLED lamp 201; in this way, the brightness of the planar OLED lamp 201 can be more uniform. FIG. 5 shows a different electrode arrangement design for the planar OLED lamp; in the embodiment, the positive electrode 60 and the negative electrode 50 of the planar OLED lamp 202 can be disposed at different sides; similarly, the elastic metal units 20, 21 of the slot module 102 can also be disposed at different sides.

Figure 6:
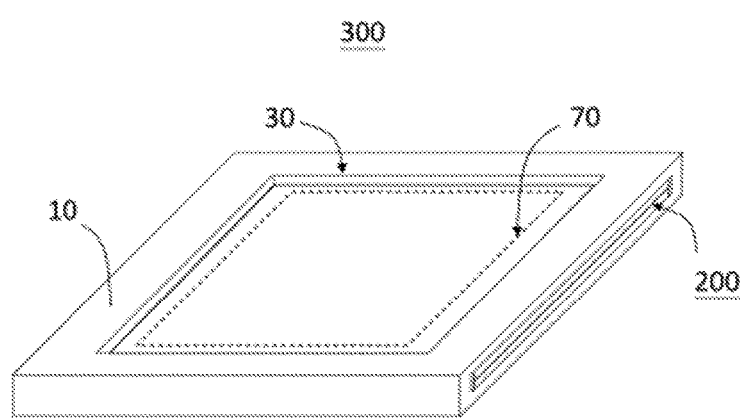
FIG. 6 is a schematic view of the assembled OLED lamp module of the first embodiment in accordance with the present invention

Further, as shown in FIG. 6, according to the first embodiment of the present invention, the planar OLED lamp module 200 can be inserted into the slot module 100, and the light-emitting zone 70 is corresponding to the transparent zone 30, so the light emitted by the planar OLED lamp 200 can be transmitted out of the transparent zone 30. In this way, the planar OLED lamp module 300 can be of simple structure, light and thin; besides, the planar OLED lamp 200 of the planar OLED lamp module 300 can be easily replaced.

Figure 7:
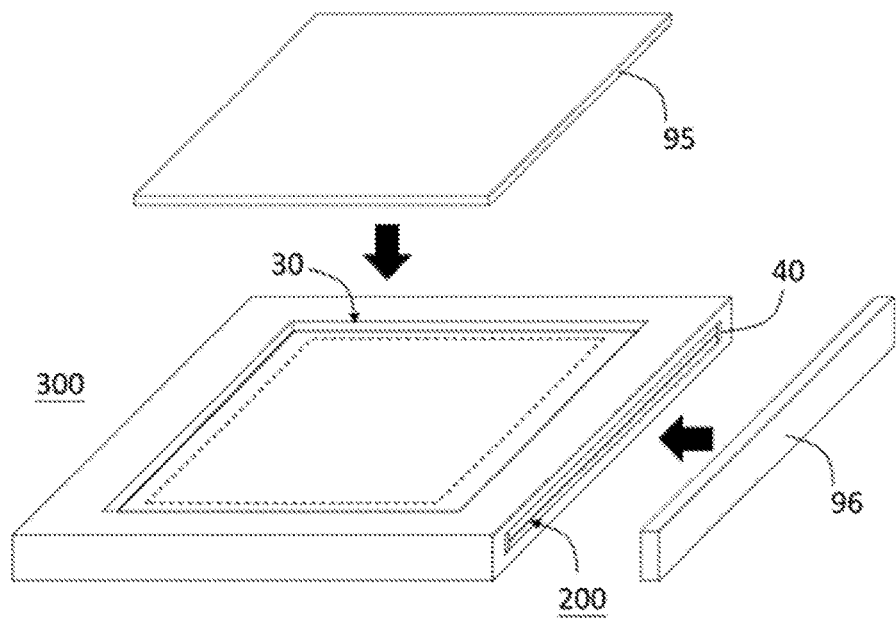
FIG. 7 is a schematic view of a fourth embodiment of an OLED lamp module in accordance with the present invention.
Figure 8:
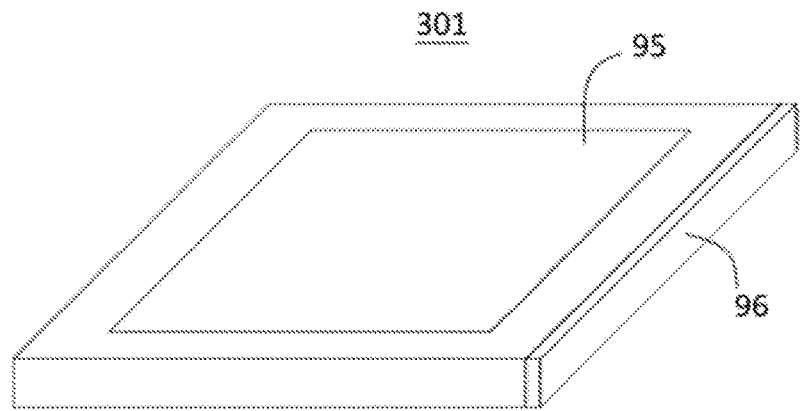
FIG. 8 is a schematic view of the assembled OLED lamp module of the fourth embodiment in accordance with the present invention

Moreover, as shown in FIG. 7, for the purpose of protecting the planar OLED lamp 200 of the planar OLED lamp module 300 to avoid that the planar OLED lamp 200 is damaged due to external impact, the transparent side of the slot module 40 is provided with a protection plate 95 with light transmittance. Meanwhile, the outer surface of the slot opening 40 is provided with a sealing cap 96; the sealing cap 96 can be used to seal the slot opening 40 in order to beautify the appearance and better the integrity of the planar OLED lamp module 300; in addition, the sealing cap 96 can also prevent dust from entering the internal space of the planar OLED lamp module 300. A light and thin planar OLED lamp module 301 of simple structure and with a planar OLED lamp easily to replace is provided after the protection plate 95 and the sealing cap 96 are installed thereon, as shown in FIG. 8.

Figure 9:
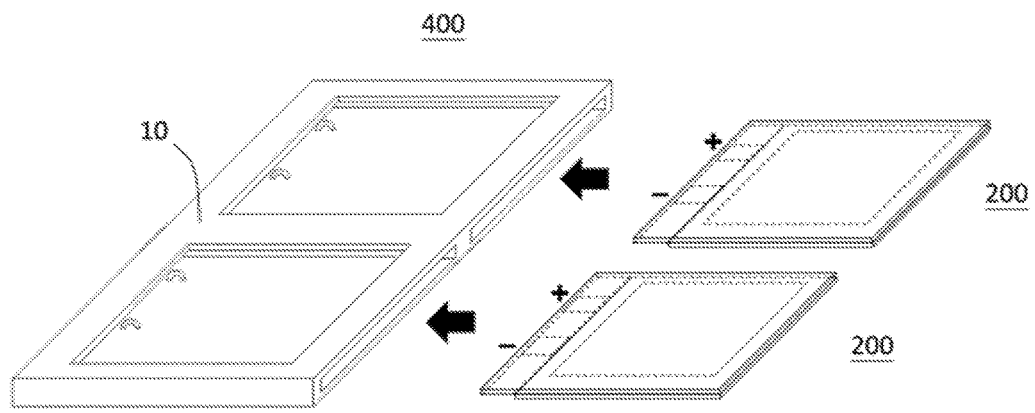
FIG. 9 is a schematic view of a fifth embodiment of an OLED lamp module in accordance with the present invention.
Figure 10:
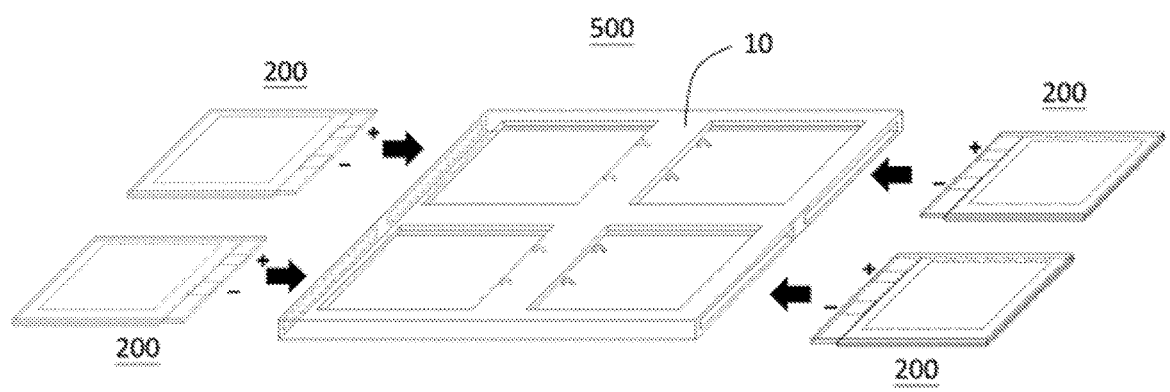
FIG. 10 is a schematic view of a sixth embodiment of an OLED lamp module in accordance with the present invention.

Furthermore, as shown in FIG. 9 and FIG. 10, the slot module 400, 500 of the planar OLED lamp module can be provided with two or more of the slot openings for two or more planar OLED lamps 200 to be inserted therein, which can satisfy the requirements of larger planar OLED lamp modules and can be applied to various lighting products, such as desk lamp, table lamp, decoration lighting products and common lighting products, etc. Additionally, in response to different appearance designs, the largest side 10 of the slot module 400, 500 is substantially square, rectangular, elliptic or circular in shape so as to match different environment landscape designs.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A planar OLED lamp module, comprising:
   at least one planar OLED lamp, comprising an OLED substrate and an OLED cover plate, wherein the OLED substrate has an OLED electrode surface, and the OLED electrode surface has at least one exposed positive electrode and at least one exposed negative electrode; and
   a slot module, wherein one side of the frame of the slot module is provided with at least one slot opening, and the slot opening comprises at least two elastic metal units disposed therein and capable of connecting to an external power source; a largest side of the slot module has at least one transparent zone; the planar OLED lamp is able to be inserted into the slot opening to electrically connect the exposed positive and negative electrodes of the planar OLED lamp to the elastic metal units therein respectively, whereby a light emitted by the planar OLED lamp is able to be transmitted out of the transparent zone.

2. The planar OLED lamp module of claim 1, wherein the slot opening comprises at least one elastic element therein, and the elastic element provides a reverse force in an insertion direction of the planar OLED lamp inserted into the slot opening.

3. The planar OLED lamp module of claim 1, wherein the least two elastic metal units are disposed at the same side.

4. The planar OLED lamp module of claim 1, wherein the at least two elastic metal units are disposed at the different sides.

5. The planar OLED lamp module of claim 2, wherein the elastic unit and the elastic metal units are integrally formed.

6. The planar OLED lamp module of claim 1, wherein a voltage supplied by the external power source connecting to the elastic metal units does not exceed 12 volts.

7. The planar OLED lamp module of claim 1, wherein a transparent side of the slot module is provided with a protection plate with light transmittance.

8. The planar OLED lamp module of claim 1, wherein the protection plate with light transmittance is made of glass or plastics.

9. The planar OLED lamp module of claim 1, wherein an outer surface of the slot opening is provided with a sealing cap.

10. The planar OLED lamp module of claim 1, wherein the slot module is provided with two or more of the slot openings.

11. The planar OLED lamp module of claim 1, wherein the largest side of the slot module is substantially square, rectangular, elliptic or circular in shape.

* * * * *